UNITED STATES PATENT OFFICE.

FRANZ HARTMANN, OF HALLEIN, AUSTRIA-HUNGARY.

ANTISEPTIC AND PROCESS OF MAKING SAME.

SPECIFICATION forming part of Letters Patent No. 568,678, dated September 29, 1896.

Application filed October 30, 1895. Serial No. 567,421. (Specimens.)

*To all whom it may concern:*

Be it known that I, FRANZ HARTMANN, a citizen of the United States of America, residing at Hallein, in the Province of Salzburg, in the Empire of Austria-Hungary, have invented certain new and useful Improvements in the Processes of Manufacturing a Solution of Sulfurous Acid, available for curative purposes; and I do hereby declare the following to be a full, clear, and exact description of the invention, such as will enable others skilled in the art to which it appertains to make and use the same.

In the treatment of diseases of the respiratory organs, as tuberculosis of the lungs and larynx, and in the treatment of wounds and diseases of the skin, as well as in surgical operations, sulfurous acid, owing to its antiseptic properties, has been extensively used, either in the form of free sulfurous acid or by using the waste lyes resulting from the manufacture of cellulose by the sulfite process. The free sulfurous acid, however, exerts a deleterious action upon the mucous membranes, in that it produces irritation to an undesirably marked degree. On the other hand, the sulfurous acid in the waste lyes referred to is mostly combined with non-volatile elements, and cannot be liberated except by the use of stronger acids, so that the liberated sulfurous acid may here also be considered as acting in the form of free sulfurous acid, with the deleterious results above referred to.

My invention has for its object the provision of means whereby the deleterious action of free sulfurous acid upon the mucous membranes is avoided without impairing the antiseptic properties of the acid. This I attain by combining the sulfurous acid with, or by mixing with the sulfurous acid, volatile aromatic substances.

In carrying out my invention I preferably proceed as follows: I heat in a suitable digester, preferably under a pressure above the normal atmospheric pressure, vegetable substances rich in ethereal oils, such as terpenes, camphenes, and other similar compounds, together with a bisulfite or bisulfites of the alkalies or alkaline earths, the vapors evolved being condensed in a suitable condenser. The product of condensation is of an amber-yellow color, has a pleasant aromatic smell, and is composed of water, ethereal oils, as terpenes or camphenes, or other similar compounds, and sulfurous acid. The liquid when exposed to atmospheric air evaporates, giving off vapors composed, essentially, of sulfurous acid and a volatile vegetable constituent or constituents of the nature above referred to.

The proportion of ethereal oils in the final product can be increased at will, or as may be found desirable, by adding ethereal oils thereto for the purpose of counteracting any irritating action of the sulfurous acid, should such action result, in the use of the final product.

The liquid may be evaporated, with a view to impregnating the air to be inhaled, and this is best effected by exposing the liquid in a more or less divided state to the action of the ambient atmosphere, as, for instance, by spraying such liquid upon pine-branches, fine wood shavings, or the like, or by allowing such liquid to penetrate through loose layers of fine wood shavings, or in any other manner exposing the liquid in as finely divided a state as possible to the evaporating influence of the atmosphere.

Having thus described my invention, what I claim as new therein, and desire to secure by Letters Patent, is—

1. The herein-described process which consists in distilling vegetable substances containing ethereal oils, as terpenes, camphenes, and other similar organic compounds in presence of a bisulfite of the alkalies or alkaline earths, and condensing the distillate.

2. The herein-described process, which consists in heating under pressure vegetable substances containing ethereal oils, as terpenes, camphenes and other similar compounds, and a bisulfite or bisulfites of the alkalies or alkaline earths, and condensing the resulting vapors.

3. The herein-described antiseptic, consisting essentially of an ethereal oil or oils, as terpenes, camphenes, and other similar compounds, sulfurous acid and water.

In testimony whereof I affix my signature in presence of two witnesses.

FRANZ HARTMANN.

Witnesses:
 DEAN MASON,
 AUG. ROBERTS.